No. 867,503. PATENTED OCT. 1, 1907.
F. HARTJE.
AUTOMOBILE SLEIGH.
APPLICATION FILED MAY 24, 1907.
2 SHEETS—SHEET 2.
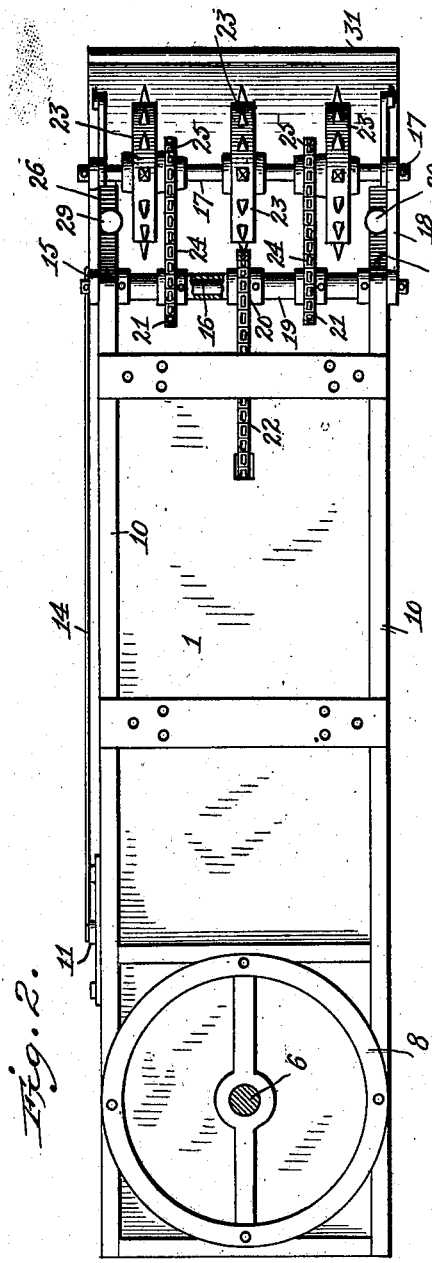
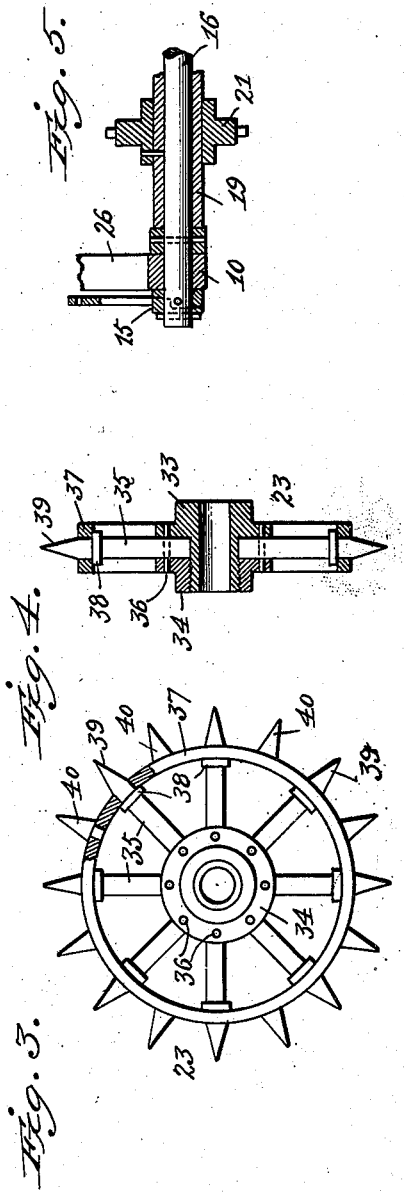
Witnesses
Edwin T. Frey
Perry B. Hill
Inventor
Fredrick Hartje
By Edwin L. Jewell
his Attorney

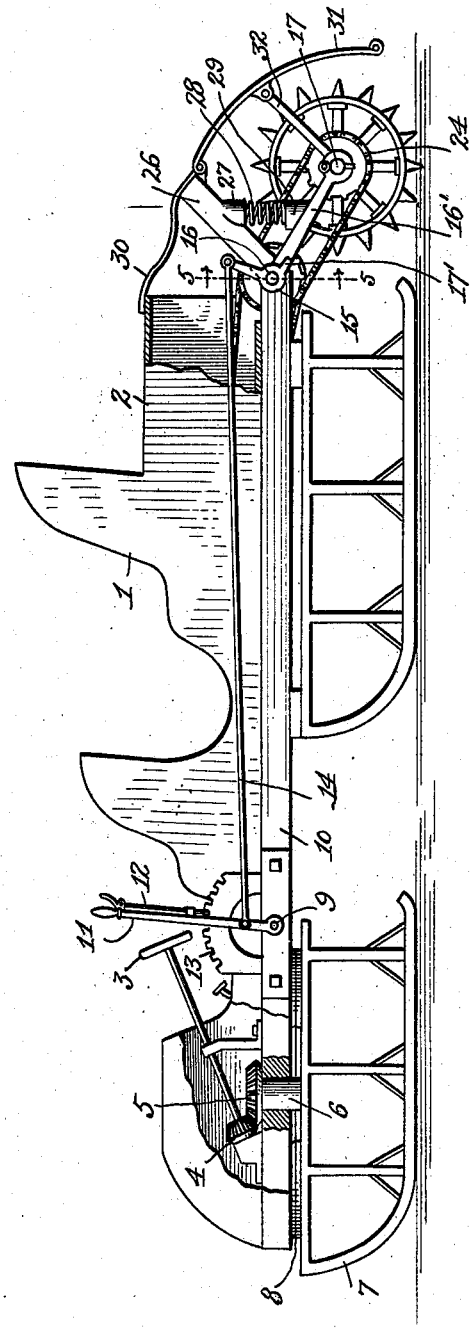

UNITED STATES PATENT OFFICE.

FREDRICK HARTJE, OF ST. THOMAS, NORTH DAKOTA.

AUTOMOBILE SLEIGH.

No. 867,503.　　　　Specification of Letters Patent.　　　　Patented Oct. 1, 1907.

Application filed May 24, 1907. Serial No. 375,379.

*To all whom it may concern:*

Be it known that I, FREDRICK HARTJE, a citizen of the United States, residing at St. Thomas, in the county of Pembina and State of North Dakota, have invented certain new and useful Improvements in Automobile Sleighs, of which the following is a specification.

My invention relates to automobile sleighs, and has for its object to provide certain improvements in the construction of the same as will be hereinafter more definitely pointed out and claimed, reference being had to the accompanying drawings, in which Figure 1 is a side elevation, partly broken away, of my improved construction. Fig. 2 is a bottom plan view of the same with the runners removed. Fig. 3 is an enlarged detail side elevation of one of the drive wheels. Fig. 4 is an enlarged vertical transverse sectional view of the same. Fig. 5 is an enlarged detail sectional view taken on the line 5—5, Fig. 1.

Similar numerals of reference denote corresponding parts in the several views.

In the said drawings the reference numeral 1 denotes the body of the automobile, which may be of any suitable construction, a gasolene, steam or other suitable motor being located in the compartment 2 to the rear of the rear seat. The particular form of motor and the means for controlling the same from the driver's seat forming no part of the present invention, the same are not shown in the drawing.

Occupying the usual position at the front of the vehicle is a steering wheel 3, carrying at its lower end a bevel gear 4, in mesh with a similar gear 5, mounted on the central post 6 of the front runners 7, a suitable fifth wheel 8 being interposed between said runner frame and the vehicle body, the whole affording means for turning said runners and steering the vehicle.

Pivoted at 9 to one of the side bars 10 of the vehicle body 1 is a lever 11 extended within reach of the driver's seat, and provided with the usual locking rod 12 engaging at its lower end with a segment rack 13 fixed to said side bar. Connected to said lever 11 above its pivot point is a connecting rod 14, that extends rearwardly of the vehicle and is connected at its rear end with one arm of a divided bell-crank lever 15, pivoted on a transverse bar 16, supported at the rear ends of the side bars 10. Said bell-crank lever carries at the end of its other arm 16′ one end of the drive wheel shaft 17, the other end of said shaft being supported by an arm 18 similarly pivoted to the other end of said transverse bar 16; the upper part of the bell-crank lever being provided with a lip 17′ which engages the lower portion 16′, to elevate the same.

Encircling the transverse bar 16 between the vehicle side bars 10 is a sleeve 19, having keyed thereon a central sprocket wheel 20 and similar sprocket wheels 21 disposed on each side of said central sprocket wheel, a drive chain 22 connecting the motor and said sprocket wheel 20 forming means for driving said sleeve 19 and sprocket wheels 21. Keyed to the drive wheel shaft 17 are a plurality of drive wheels 23, hereinafter described, the rotation of sleeve 19 being imparted to said shaft 17 through sprocket chains 24 connecting sprocket wheels 21, with similar sprocket wheels 25 keyed to said shaft 17.

The rear ends 26 of the side bars 10 are extended upwardly at an angle and are provided on their under sides with sockets 27, in which are seated the upper ends of coiled springs 28, seated at their lower ends in similar sockets 29 formed on the bell crank levers 15 and bar 18, said springs serving to resist and cushion any jar to the drive wheels 23 caused by passing over inequalities in the surface traversed.

Extending from the motor compartment 2 to the ends of the extensions 26 is a shield 30, having pivoted thereto at its outer end an extension shield 31 that is otherwise supported to rise and fall with the drive wheels 23 by means of bars 32 pivoted thereto and to the drive wheel shaft 17, this construction effectually covering the drive wheels and yet following the vertical movement thereof.

The drive wheels 23 consist each of a hub 33 cut away annularly at one side and screw-threaded to receive a similarly screw-threaded sleeve 34, the ends of the spokes 35 being securely clamped between said hub and sleeve, as best seen in Fig. 4, suitable retaining pins 36 being employed if desired to more firmly retain said spokes in position. Said spokes extend outwardly through a metallic rim 37, being provided with shoulders 38 to position said rim, and terminate in spiked ends 39 adapted to engage the surface traveled over. Intermediate the spokes I provide similar spikes 40 fixed in the rim 37 to provide a large number of engaging points without increasing the number of spokes. It will be observed that by dividing the bell crank lever, the shaft 17 carrying the drive wheels 23, can move vertically independent of the elevating devices 11 and 14.

From the above description it will be understood that by means of lever 11, connecting rod 14 and bell-crank lever 15, I provide means for varying the position of the drive wheels 23 vertically, it being observed that the levers 15 and 18 supporting the shaft 17 thereof are pivoted concentrically with the sleeve 19 through which said drive wheels are driven, whereby the variation in the vertical position of the drive wheel shaft 17 will not affect the tension of sprocket chains 24.

Having thus described my invention, what I claim as new and desire to secure by Letters Patent, is:—

1. In an automobile sleigh, a series of drive wheels adapted to engage the surface traversed, arms supporting the shaft of said drive wheels, a transverse bar to which the inner ends of said arms are connected, means for rocking said arms to raise or lower said shaft and drive wheels, a sleeve encircling said transverse bar, a motor, and connections between said motor and sleeve and said sleeve and drive wheel shaft for rotating the latter.

2. In an automobile sleigh, a series of drive wheels adapted to engage the surface traversed, means for rotating said wheels, means for shifting said wheels vertically, a shield pivoted to the automobile body and covering said drive wheels, and connections between the drive wheel shaft and said shield whereby vertical movement imparted to said drive wheels will be similarly imparted to said shield.

In testimony whereof I have hereunto set my hand in the presence of two subscribing witnesses.

FREDRICK HARTJE.

Witnesses:
S. E. PETERSON,
G. H. GARNETT.